US012132252B2

(12) United States Patent
Reichardt et al.

(10) Patent No.: US 12,132,252 B2
(45) Date of Patent: Oct. 29, 2024

(54) ANTENNA SYSTEM

(71) Applicant: AUDI AG, Ingolstadt (DE)

(72) Inventors: Lars Reichardt, Wettstetten (DE); Amir Cenanovic, Hepberg (DE)

(73) Assignee: AUDI AG, Ingolstadt (DE)

( * ) Notice: Subject to any disclaimer, the term of this patent is extended or adjusted under 35 U.S.C. 154(b) by 95 days.

(21) Appl. No.: 17/769,648

(22) PCT Filed: Sep. 15, 2020

(86) PCT No.: PCT/EP2020/075701
§ 371 (c)(1),
(2) Date: Apr. 15, 2022

(87) PCT Pub. No.: WO2021/089223
PCT Pub. Date: May 14, 2021

(65) Prior Publication Data

US 2023/0137538 A1 May 4, 2023

(30) Foreign Application Priority Data

Nov. 4, 2019 (DE) ..................... 10 2019 129 630.7

(51) Int. Cl.
*H01Q 1/32* (2006.01)
*H01Q 1/12* (2006.01)
*H01Q 1/42* (2006.01)

(52) U.S. Cl.
CPC ......... *H01Q 1/3275* (2013.01); *H01Q 1/1207* (2013.01); *H01Q 1/42* (2013.01)

(58) Field of Classification Search
CPC .. H01Q 1/1207; H01Q 1/1214; H01Q 1/3275; H01Q 1/42
See application file for complete search history.

(56) References Cited

U.S. PATENT DOCUMENTS 7,091,912 B2 8/2006 Iacovella et al.
7,358,910 B2 4/2008 Blickle
10,355,335 B2 7/2019 Ohno et al.
2009/0201216 A1* 8/2009 Gerneth .............. H01Q 1/3275 343/872

(Continued)

FOREIGN PATENT DOCUMENTS

DE 102006015923 A1 11/2006
DE 102007054141 B4 5/2009

(Continued)

OTHER PUBLICATIONS

International Search Report and Written Opinion of the International Searching Authority directed to related International Patent Application No. PCT/EP2020/075701, mailed Nov. 23, 2020, with attached English-language translation; 19 pages.

(Continued)

*Primary Examiner* — Thien M Le
(74) *Attorney, Agent, or Firm* — Sterne, Kessler, Goldstein & Fox P.L.L.C.

(57) ABSTRACT

The invention relates to an antenna system for an outer wall of a vehicle, comprising an antenna assembly having a housing, a base body made of an electrically insulating material, and a support plate, wherein electronic components for a plurality of antenna modules are arranged on the base body.

11 Claims, 2 Drawing Sheets

(56) References Cited

U.S. PATENT DOCUMENTS

| | | | | |
|---|---|---|---|---|
| 2010/0283684 | A1* | 11/2010 | Rabinovich | H01Q 5/371 343/700 MS |
| 2011/0279329 | A1* | 11/2011 | Kleinert | H01Q 1/1214 343/702 |
| 2015/0307026 | A1* | 10/2015 | Minikey, Jr. | H01Q 1/42 348/148 |
| 2017/0062914 | A1 | 3/2017 | Masaka et al. | |
| 2017/0317408 | A1* | 11/2017 | Hamada | B62D 25/06 |
| 2018/0261913 | A1* | 9/2018 | Imamura | H01Q 5/335 |
| 2019/0006744 | A1 | 1/2019 | Taira et al. | |
| 2019/0123774 | A1* | 4/2019 | Zhan | H04B 3/548 |
| 2020/0028249 | A1* | 1/2020 | Terashita | H01Q 9/36 |
| 2020/0343627 | A1* | 10/2020 | Gahner | H01Q 1/3275 |
| 2020/0350943 | A1* | 11/2020 | Zhan | H04B 1/38 |
| 2021/0044006 | A1* | 2/2021 | Shimizu | B60R 11/04 |
| 2022/0340089 | A1* | 10/2022 | Tamai | B60R 11/00 |

FOREIGN PATENT DOCUMENTS

| | | | |
|---|---|---|---|
| DE | 202009003448 | U1 | 5/2009 |
| DE | 102012202677 | A1 | 8/2012 |
| DE | 102012006360 | A1 | 10/2013 |
| DE | 112015003498 | T5 | 4/2017 |
| EP | 0862239 | A1 | 9/1998 |
| EP | 1286414 | A1 | 2/2003 |
| EP | 1760826 | B1 | 3/2007 |
| EP | 3561952 | A1 | 10/2019 |
| WO | WO 2006/108608 | A1 | 10/2006 |

OTHER PUBLICATIONS

International Preliminary Report on Patentability directed to related International Patent Application No. PCT/EP2020/075701, completed Feb. 16, 2022, with attached English-language translation; 23 pages.

* cited by examiner

ANTENNA SYSTEM

TECHNICAL FIELD

The application relates to an antenna system.

Due to new services and increasing demands on the quality and data rate of wireless services, the number of antennas to be installed in vehicles is constantly increasing. In contrast, the antenna should be installed as hidden as possible for design reasons. Typical installation spaces are next to the roof for a roof antenna, a bumper for a telephone antenna, a spoiler or a pane, with an antenna being designed as a structure printed onto the pane. The advantage of the roof antenna is that it has undisturbed reception around the vehicle for using Bluetooth, a telephone, and a remote-controlled parking heater. Also, it has access to the sky to use satellite services. However, a roof antenna is visible to the customer and has a mostly flat structure in the front region in terms of appearance.

BACKGROUND

DE 11 2015 003 498 T5 shows a vehicle antenna device.

Fastening a roof antenna by inserting a tool through a passage in an antenna rod receiving part of a cover is known from EP 1 760 826 B1.

U.S. Pat. No. 7,091,912 B2 shows a vehicle antenna with improved screening.

Another vehicle antenna is known from DE 10 2007 054 141 B4.

EP 3 561 952 A1 describes an antenna for a vehicle having an insulating antenna housing and a plastic base to which the antenna housing is fastened.

US 2017/0062914 A1 describes an antenna device for a vehicle having a base plate made of resin.

Another antenna device is known from US 2019/0006744 A1.

A roof antenna and a method for fastening a roof antenna to a vehicle body are known from DE 10 2012 202 677 A1. In this case, the roof antenna is installed on an opening in the vehicle body and is held in a pre-installation position on the vehicle body. Furthermore, the roof antenna is fixed in its final installation position to the vehicle body by means of a clamping plate.

BRIEF DESCRIPTION OF THE DRAWINGS/FIGURES

DETAILED DESCRIPTION

Figure 1:
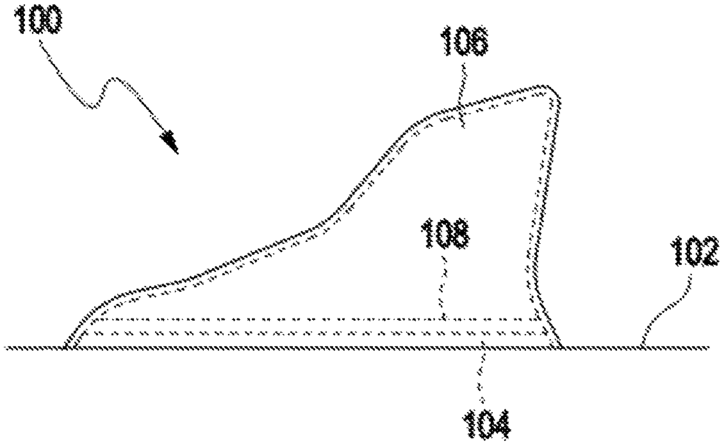
Fig. 1 (Prior art)
FIG. 1 is a schematic illustration of an antenna assembly known from the prior art.

The present application is concerned with making an antenna for a vehicle, compact.

This object is achieved by an antenna system having the features of the independent claims. Embodiments of the antenna system can be derived from the dependent claims and the description.

The antenna system according to the application is provided for a roof as the outer wall of a vehicle and has an antenna assembly which has a housing, a base body made of an electrically insulating or non-conductive material, and a support plate. In this case, electronic components for a plurality of antenna modules are arranged on the electrically insulating base body, wherein the antenna assembly has fastening elements, wherein the support plate is fastened to the roof by means of the fastening elements within the roof from an inner side of the roof.

In accordance with some embodiments, the base body is made of plastic material. The multiple antenna modules are different or differ from one another, with different antenna modules being designed for different radio technologies, for different transmission standards with electromagnetic waves, for example for different telecommunication services. In this case, for example, electromagnetic waves with different frequencies are sent and/or received by the different antenna modules. The different antenna modules can be operated independently of one another.

In addition, the antenna assembly has fastening elements for fastening the housing and the base body to, on, and/or in the outer wall. At least one first fastening element is designed in the form of a pin, for example a screw or bolt. At least one second fastening element can be designed as a flat pane, wherein the base body is clamped or is to be clamped between the second fastening element and the support plate and is thus also fastened or is to be fastened. As a rule, the antenna system is designed to fasten the antenna assembly to the outer wall.

In addition to the antenna assembly, the antenna system has a recess in the outer wall. The recess is designed to receive the support plate in the outer wall.

The antenna system presented is designed for the outer wall designed as a roof.

Furthermore, at least one electronic circuit is arranged on the base body. In accordance with some embodiments, a plurality of separate electronic circuits are arranged on it as electronic components for a plurality of antenna modules.

In addition, a maximum distance is provided between electronic components, for example electronic circuits, of two different antenna modules.

Different antenna modules of the antenna system are designed to use different radio technologies.

The antenna assembly of the antenna system presented has the base body made of plastic material and the support plate, as a result of which additional installation space for antenna modules and/or electrical components can be provided within the antenna assembly. It is possible to arrange a plurality of telephone emitters, for example two telephone emitters or at least three telephone emitters, as different antenna modules in the antenna assembly and thus to build them up or to integrate them into the antenna assembly.

It is thus possible to expand the installation space of the antenna assembly that can be used for electronic components and/or within the antenna assembly by using the base body made of a non-conductive material, wherein the base body is or will be made of plastic material as the non-conductive material, for example. This also means that the weight of the antenna assembly can be reduced and costs can also be saved.

A counterweight and/or a ground plane of the antenna assembly is/are provided by the support plate. During installation of the antenna assembly from the inside, i.e. starting from an interior of the vehicle, the support plate is fastened, for example screwed, to the outer wall from the inner side of the outer wall designed as a roof, for example starting from a roof liner. It is provided that the support plate galvanically and/or capacitively connects the antenna assembly to the outer wall.

Due to such a construction of the antenna assembly of the antenna system, the result is that additional installation space is created for the electronic components and/or antenna modules to be received therein. An installation space enclosed by the antenna assembly or by a housing of the antenna assembly has a maximum extension in a longitudinal direction, the installation space having a first, e.g. front end, and a second, e.g. rear end, these two ends being arranged within the housing. It is possible for an antenna module to be arranged at each end, the antenna modules which are to be arranged or are arranged in the installation space being provided for different services and communicating via electromagnetic waves of different frequencies for different radio technologies. These two different antenna modules have a maximum possible distance at the two described ends within the installation space and/or housing. In this case, the antenna modules are decoupled from one another by means of the base body, design parameters for the decoupling of the antenna modules being formed as a result. One of the two antenna modules can, for example, be designed in the form of an LTE emitter for the LTE standard. It is also possible for at least one antenna module to be designed for a fourth-generation 4G or fifth-generation 5G mobile radio standard.

It is also possible to integrate an antenna module for a global navigation satellite system (GNSS) in the antenna assembly or in its installation space. It is also possible to retract the antenna assembly and/or its installation space at least partially into the outer wall, e.g. the roof, thereby minimizing the influence of reflected and/or scattered position signals from the global navigation satellite system. Furthermore, it is possible to cut out the support plate under the installation space or a free space, as a result of which a wider design scope is obtained.

The at least one antenna module can be designed and/or referred to as a telephone emitter for which a bandwidth of a frequency of, for example, 617 megahertz up to 5 gigahertz is provided. By configuring the antenna assembly, it is possible, for example, to integrate two telephone emitters of this type, which utilize frequencies, usually different frequencies, within the stated bandwidth for communication, in the antenna assembly and thus in the antenna system.

The at least one antenna module can have an electronic printed circuit board (PCB) as an electronic component and/or be designed as a printed circuit board of this type. An antenna module of this type, for example designed as a printed circuit board, is arranged directly on the base body made of the electrically insulating material.

The base body or an antenna body of the antenna system is made of insulating material such as plastics material. The antenna modules are located outside of the vehicle, with the antenna body closing the recess in the vehicle or a hole in the outer wall, for example a roof, of the vehicle. The support plate made of metal, for example, in the recess of the vehicle forms a counterweight to the antenna assembly and is used for the galvanic connection of the antenna assembly to the outer wall, for example to the roof. Nevertheless, a cavity provided by the recess in the outer wall can be used as installation space for the antenna assembly. The antenna modules or antenna emitters can be partially retracted into the roof using a mechanical device.

Further advantages and embodiments of the application can be found in the description and the attached drawing.

It is evident that the features mentioned above and those yet to be described below can be used not only in the particular combination indicated, but also in other combinations or in isolation, without exceeding the scope of the present application.

The invention is depicted schematically by means of embodiments in the drawings and shall be described schematically and in detail with reference to the drawings.

The figures are described in a coherent and comprehensive manner, and the same reference signs are assigned to the same components.

The antenna assembly 100 known from the prior art and shown schematically in FIG. 1 is designed and/or can be referred to as a telephone emitter. In this case, the antenna assembly 100 is arranged on a roof 102, in this case on a roof plane, of a vehicle. This antenna assembly 100 has a die-cast body 104 made of zinc as the foundation. Furthermore, the antenna assembly 100 comprises a housing 106 which is connected to the die-cast body 104, the die-cast body 104 and the housing 106 enclosing an installation space of the antenna assembly 100. Within the installation space above the die-cast body 104, a plane 108 is indicated in FIG. 1, in which plane a printed circuit board (not shown in more detail) is arranged as an electronic component. It is provided that the die-cast body 104 made of metal serves as a carrier for the printed circuit board (PCB). The installation space between the printed circuit board and the housing 106 then remains as an antenna cap for an antenna design.

Figure 2:
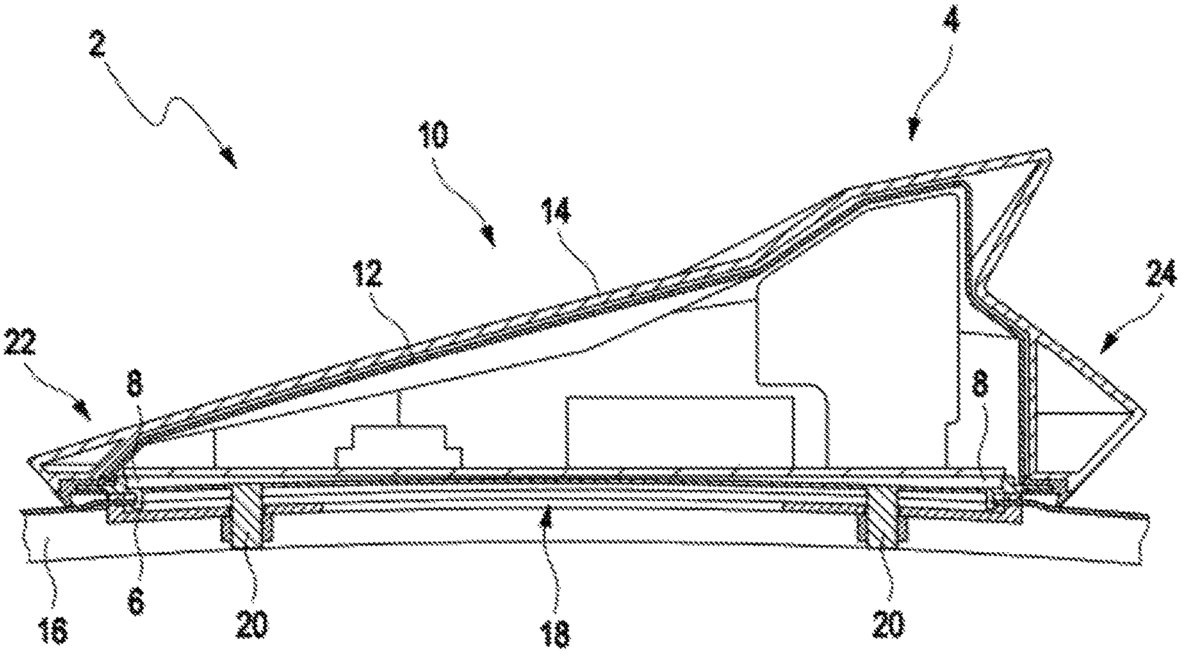
FIG. 2 is a schematic illustration of a first embodiment of the antenna assembly according to the application.

The first embodiment of the antenna system 2 shown schematically in FIG. 2 comprises an antenna assembly 4 which has a support plate 6 on which a base body 8 made of an electrically insulating or electrically non-conductive material, in this case made of plastics material, is arranged. In addition, the antenna assembly 4 comprises a housing 10 which in turn has an inner cap 12 and a design cap 14. In this case, the inner cap 12 and the support plate 6 enclose an installation space of the antenna assembly 4. Furthermore, the design cap 14 encloses the inner cap 12.

The antenna system 2 presented in this case is provided for an outer wall of the vehicle designed as a roof 16, the roof 16 having a recess 18 which is arranged on an outer side of the roof and/or is integrated into the roof 16. In this case, the support plate 6 is arranged within the recess 18. Depending on the definition, it is possible for this recess 18 to also be formed as part of the embodiment of the antenna system 2 presented in this case. Furthermore, the antenna system 2 has a plurality of fastening elements 20, via which the support plate 6 and thus also the antenna assembly 4 are fastened to the roof 16, i.e. in this case within the recess 18 of the roof 16. It is provided in this case that, during installation of the antenna assembly 4, the support plate 6 is arranged in the recess 18. Starting from an inner side of the roof 16, the fastening elements 20 extend through openings within the roof, with the antenna assembly 4 being fastened to the roof 16 via the fastening elements 20.

Depending on the definition, the recess 18 within the roof 16 can be designed and/or referred to as a hole or roof hole, which has a size that is designed for the assembly, for example for the complete assembly of the support plate 6 in the roof 16. In addition, it is possible to screw the antenna assembly 4 securely and in a watertight manner to the roof 16 via the fastening elements 20, the support plate 6 being fastened, by means of the fastening elements 20 designed as screws, to the roof 16 and/or within the roof 16 from below or being screwed from the inner side of the roof 16.

A size of the antenna assembly 4, a curvature of the roof 16, and a pre-embossing of the recess 18 in the roof 16, with the recess 18 being oriented upward or outward, allow, by providing the base body 8 which can be designed as a plastics carrier or at least as a partial plastics carrier, the use of an additional installation space for an antenna module designed or to be designated as an emitter in a front region of the antenna assembly 4, which region is flat in this case.

By definition, the antenna assembly 4 in this case has a first front end 22 and a second rear end 24. It is provided that the height of the installation space at the front end 22 is less than in or at the rear end 24. Overall, the height of the installation space enclosed by the housing 10 and the support plate 6 increases, starting from the first front end 22 towards the second rear end 24. The housing 10 of the antenna assembly 4 is designed to be aerodynamic, with the first front end 22 being arranged in front of the second rear end 24 in a forward direction of travel of the vehicle.

In the embodiment of the antenna system 2 presented in this case, a physical installation space for a first antenna module is provided in the region of the first front end 22 and a physical installation space for a second antenna module is provided in the region of the second rear end 24. A corresponding antenna module can be designed and/or referred to as an emitter. A corresponding antenna module is arranged on the base body 8 in the region of a corresponding end 22, 24. A maximum longitudinal distance extends between the two ends 22, 24 within the installation space, as a result of which sufficient decoupling of the antenna modules within the antenna assembly 4 is ensured.

Figure 3:
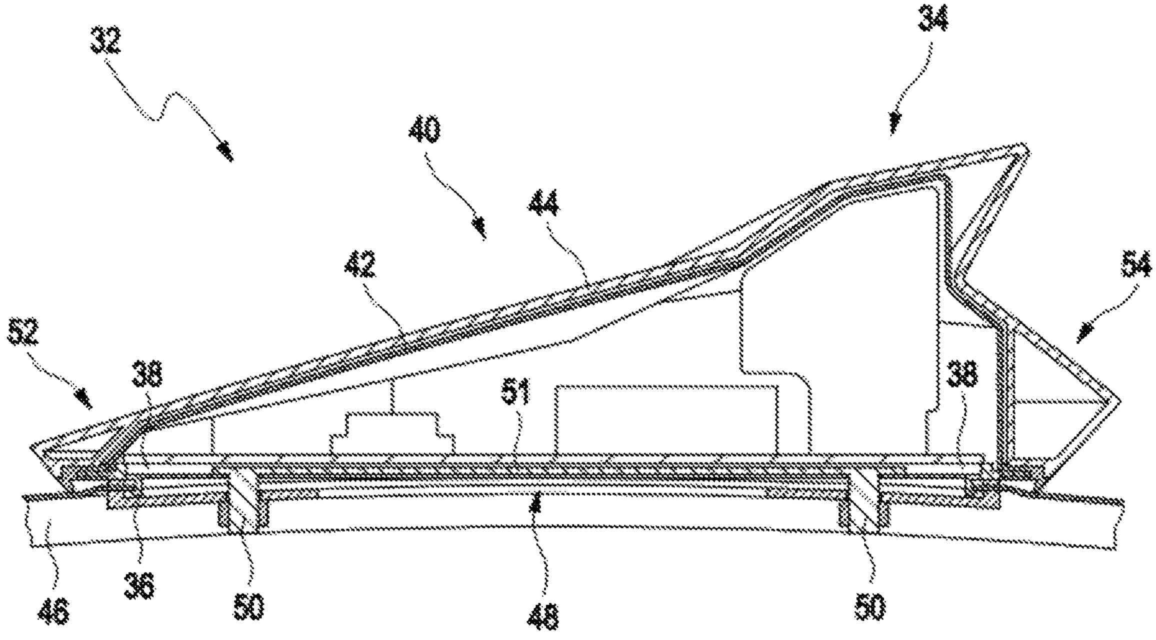
FIG. 3 is a schematic illustration of a second embodiment of the antenna assembly according to the application

The second embodiment of the antenna system 32 shown schematically in FIG. 3 comprises an antenna assembly 34 which has a support plate 36 on which a base body 38 made of an electrically insulating or electrically non-conductive material, in this case made of plastics material, is arranged. In addition, the antenna assembly 34 comprises a housing 40 which in turn has an inner cap 42 and a design cap 44. In this case, the inner cap 42 and the support plate 36 enclose an installation space of the antenna assembly 34. Furthermore, the design cap 44 encloses the inner cap 42.

The antenna system 32 presented in this case is provided for an outer wall of the vehicle designed as a roof 46, the roof 46 having a recess 48 which is arranged in an outer side of the roof and/or is integrated into the roof 46. In this case, the support plate 36 is arranged within the recess 48. Depending on the definition, it is possible for this recess 48 to also be formed as part of the embodiment of the antenna system 32 presented in this case. Furthermore, the antenna system 32 has a plurality of fastening elements 50, 51 via which the support plate 36 and thus also the antenna assembly 34 is fastened to the roof 46, i.e. in this case within the recess 48 of the roof 46. In this case, three first fastening elements 50 are designed as screws or bolts. A second fastening element 51 is designed in this case as a flat plate or pane. It is provided in this case that, during installation of the antenna assembly 34, the support plate 36 is arranged in the recess 48. Starting from an inner side of the roof 46, the first fastening elements 50 extend through openings within the roof 46. In addition, the base body 38 is clamped between the support plate 36 and the second flat fastening element 51. The base body 38, the support plate 36, and the second fastening element 51 are fastened to the roof 46 via the first fastening elements 50 in the recess 48 of the roof 46.

Depending on the definition, the recess 48 within the roof 46 can be formed and/or referred to as a hole or roof hole that has a size that is formed for the assembly, for example for the complete assembly, of the support plate 36 in the roof 46. It is also possible to screw the antenna assembly 34 securely and in a watertight manner to the roof 46 via fastening elements 50, 51, with the support plate 36 being screwed to the roof 46 and/or within the roof 46 from below or from the inner side of the roof 46 by means of the first fastening elements 50 and the second fastening element 51.

A size of the antenna assembly 34, a curvature of the roof 46, and a pre-embossing of the recess 48 in the roof 46, with the recess 48 being oriented upward or outward, allow, by providing the base body 48 which can be designed as a plastics carrier or partial plastics carrier, the use of additional installation space for an antenna module designed or to be designated as an emitter in a front region of antenna assembly 34, which region is flat in this case.

In this case, by definition, the antenna assembly 34 has a first front end 52 and a second, rear end 54. It is provided that the height of the installation space at the front end 52 is less than in or at the rear end 54. Overall, the height of the installation space enclosed by the housing 40 and the support plate 36 increases, starting from the first front end 52 towards the second rear end 54. The housing 40 of the antenna assembly 34 is designed to be aerodynamic, with the first front end 52 being arranged in front of the second rear end 54 in a forward direction of travel of the vehicle.

In the embodiment of the antenna system 32 presented in this case, a physical installation space for a first antenna module is provided in the region of the first front end 52, and a physical installation space for a second antenna module is provided in the region of the second end 54. A corresponding antenna module can be designed and/or referred to as an emitter. In this case, a corresponding antenna module is arranged in the region of a corresponding end 52, 54 on the base body. A maximum longitudinal distance extends between the two ends 52, 54 within the installation space, as a result of which sufficient decoupling of the antenna modules is ensured.

REFERENCE SIGNS

2 Antenna system
4 Antenna assembly
6 Support plate
8 Base body
10 Housing
12 Inner cap
14 Design cap
16 Roof
18 Recess
20 Fastening element
22, 24 End
32 Antenna system
34 Antenna assembly
36 Support plate
38 Base body
40 Housing
42 Inner cap
44 Design cap
46 Roof
48 Recess
50, 51 Fastening element
52, 54 End
100 Antenna assembly
102 Roof
104 Base body
106 Housing
108 Plane

The invention claimed is:

1. An antenna system for an outer wall of a vehicle, wherein the outer wall is a roof, the antenna system comprising:

an antenna assembly having:

a base body made of electrically insulating material wherein a plurality of electronic components for a plurality of antenna modules are arranged on the base body;

a support plate, wherein the support plate is received in a recess in the outer wall, wherein the support plate is configured to fasten to the outer wall from an inner side of the outer wall, and galvanically and/or capacitively connects the antenna assembly to the outer wall, and wherein the support plate is made of metal in order to serve as a counterweight and/or ground plane for the antenna assembly; and a housing comprising an inner cap, wherein the inner cap and the support plate enclose an installation space for the plurality of antenna modules.

2. The antenna system of claim 1, wherein the base body is made of plastic material.

3. The antenna system of claim 1 wherein the antenna system is configured to fasten to the roof of the vehicle using a first fastening element, and wherein the first fastening element comprises screws or bolts.

4. The antenna system of claim 1, wherein at least one electronic circuit is arranged on the base body.

5. The antenna system of claim 1, wherein a maximum distance is provided between electronic components of two different antenna modules of the plurality of antenna modules.

6. The antenna system of claim 1, wherein different antenna modules of the plurality of antenna modules are designed to use different radio technologies.

7. The antenna system of claim 1, wherein the base body is clamped between the support plate and a second fastening element, wherein the second fastening element is configured as a flat plate or a pane.

8. The antenna system of claim 1, wherein the installation space has a front end and a rear end, and a height of the installation space enclosed by the inner cap and the support plate increases from the front end to the rear end.

9. The antenna system of claim 1, further comprising an emitter in a front region of the antenna assembly.

10. The antenna system of claim 1, wherein the antenna assembly is configured to be at least partially retractable into the roof.

11. The antenna assembly of claim 1, wherein the housing further comprises an outer cap that encloses the inner cap.

* * * * *